United States Patent [19]

Jangi et al.

[11] Patent Number: 5,535,271
[45] Date of Patent: Jul. 9, 1996

[54] APPARATUS AND METHOD FOR DUAL TONE MULTIFREQUENCY SIGNAL DETECTION

[75] Inventors: Shrirang Jangi, Germantown; Jie Chen, North Potomac, both of Md.

[73] Assignee: Hughes Electronics, Los Angeles, Calif.

[21] Appl. No.: 250,783

[22] Filed: May 27, 1994

[51] Int. Cl.$^6$ .................................................. H04M 1/00
[52] U.S. Cl. .......................... 379/351; 379/282; 379/283; 379/372; 379/386
[58] Field of Search ........................... 379/282, 283, 379/351, 372, 386

[56] References Cited

U.S. PATENT DOCUMENTS

| | | | |
|---|---|---|---|
| 4,689,760 | 8/1987 | Lee et al. ........................ | 379/386 X |
| 4,696,031 | 9/1987 | Freudberg et al. .................. | 379/386 |
| 4,853,958 | 8/1989 | Rabipour et al. ................... | 379/386 |
| 4,908,825 | 3/1990 | Vea ............................... | 379/283 X |
| 4,979,214 | 12/1990 | Hamilton ......................... | 381/46 |
| 5,073,971 | 12/1991 | Schaeffer ........................ | 455/33 |
| 5,163,050 | 11/1992 | Cromack ......................... | 379/351 X |
| 5,251,256 | 10/1993 | Crowe et al. ..................... | 379/386 |
| 5,257,309 | 10/1993 | Brandman et al. ................. | 379/283 |
| 5,267,305 | 11/1993 | Proh et al. ....................... | 379/233 |
| 5,311,589 | 5/1994 | Bennett et al. .................... | 379/386 |
| 5,321,745 | 6/1994 | Drory et al. ...................... | 379/351 |
| 5,325,427 | 6/1994 | Digne ............................. | 379/386 |
| 5,353,346 | 10/1994 | Cox et al. ........................ | 379/386 |
| 5,392,348 | 2/1995 | Park et al. ....................... | 379/386 |

FOREIGN PATENT DOCUMENTS

| | | | |
|---|---|---|---|
| 566928 | 10/1993 | European Pat. Off. ............... | 379/386 |
| 0575725 | 12/1993 | European Pat. Off. . | |
| 0576980 | 1/1994 | European Pat. Off. . | |
| 0579927 | 1/1994 | European Pat. Off. ............... | 379/283 |
| 61-013793 | 1/1986 | Japan ............................. | 379/386 |

OTHER PUBLICATIONS

"Algorithms for Multi-Channel DTMF Detection for the WE® DSP32 Family" Gay et al., IEEE 1989, pp. 1134–1137.

P. Mock, "Add DTMF Generation and Decoding to DSP-uP Designs," EDN, Mar. 21, 1985.

*Primary Examiner*—Jeffery Hofsass
*Assistant Examiner*—Scott L. Weaver
*Attorney, Agent, or Firm*—Gordon R. Lindeen, III; Wanda K. Denson-Low

[57] ABSTRACT

A DTMF digit detecting method and apparatus includes signal state identifier (32) for identifying whether the received signal is in a DTMF-digit-detect state, a no-detect high-energy state, or a no-detect low-energy state, digit candidate identification processor (34) for identifying a digit candidate when the presence of a state other than the no-detect low-energy state is detected following a detection of the presence of the no-detect low-energy state for a first predetermined period of time, digit identifier (32) for identifying a DTMF digit corresponding to a sample group in a DTMF-digit-detect state, and valid digit identifier (34) for identifying a valid DTMF digit when at least a first predetermined number of sample groups are all in the DTMF-digit-detect state or in an allowable combination of states. An allowable combination of states exists provided the following conditions are met: (1) at least half of the first predetermined number of sample groups are in the DTMF-digit-detect state and correspond to the same DTMF digit; (2) no two sequential sample groups are in a state other than the DTMF-digit-detect state; and (3) no two sequential sample groups in the DTMF-digit-detect state correspond to one or more DTMF digits other than the DTMF digit corresponding to at least half of the first predetermined number of sample groups.

14 Claims, 4 Drawing Sheets

APPARATUS AND METHOD FOR DUAL TONE MULTIFREQUENCY SIGNAL DETECTION

BACKGROUND OF THE INVENTION

1. Field of the Invention

The present invention relates to a method and apparatus for detecting the presence of dual-tone multifrequency (DTMF) digits in a signal. More particularly, the present invention relates to an improved method and apparatus for robustly detecting DTMF digits while eliminating false detections that may occur due to glitches in the signal or resemblance of a voice to a DTMF digit.

2. Discussion of the Related Art

The use of DTMF signalling has increased rapidly because it is quickly replacing dial-pulse signalling in telephone networks around the world. In addition, DTMF signalling has found increased use in interactive control signalling.

The increased presence of DTMF signalling has triggered a demand for DTMF detectors that can more accurately detect the presence of DTMF digits in a received signal. However, conventional DTMF detectors tend to falsely detect two DTMF digits when only a single DTMF digit is present in a signal having a small glitch. Conventional DTMF detectors additionally have difficulty distinguishing a valid DTMF digit from voice signals having a resemblance to a DTMF digit.

SUMMARY OF THE INVENTION

Accordingly, the present invention has been made in view of the above circumstances and has as an object to provide a method and apparatus for detecting DTMF digits while eliminating false detections that may occur due to glitches in the signal or resemblance of voice signals to a DTMF digit.

A further object of the present invention is to robustly detect DTMF digits in the presence of noise.

Additional objects and advantages of the invention will be set forth in part in the description which follows and in part will be apparent from the description, or may be learned by practice of the invention. The objects and advantages of the invention may be realized and attained by means of the instrumentalities and combinations particularly pointed out in the written description and appended claims hereof, as well as the accompanying drawings.

Moreover, the above objects and advantages may be achieved by the DTMF digit detector of this invention comprising signal state identification means for identifying whether the received signal is in a DTMF-digit-detect state, a no-detect high-energy state, or a no-detect low-energy state, digit candidate identification means for identifying a digit candidate when the presence of a state other than the no-detect low-energy state is detected following a detection of the presence of the no-detect low-energy state for a first predetermined period of time, and valid digit identifying means for identifying a digit candidate as a valid DTMF digit when (1) the presence of the DTMF-digit-detect state or allowable combinations of DTMF-digit-detect states and other states are detected for at least a second predetermined period of time after the digit candidate identification means identifies the digit candidate, and (2) the presence of a no-detect state is detected for a third predetermined time period following detection of the presence of the DTMF-digit-detect state or the allowable combinations of DTMF-digit-detect states and other states.

Similarly the objects and advantages of the present invention may be obtained by a DTMF digit detector comprising sample grouping means for grouping samples of the received signal into sample groups, signal state identification means for identifying for each sample group of the received signal whether the sample group is in a DTMF-digit-detect state, a no-detect high-energy state, or a no-detect low-energy state, digit identification means for identifying a DTMF digit corresponding to a sample group in a DTMF-digit-detect state, and valid digit identifying means for identifying a valid DTMF digit when at least a first predetermined number of sample groups are all in the DTMF-digit-detect state or in an allowable combination of states, wherein an allowable combination of states exists provided the following conditions are met: (1) at least half of the first predetermined number of sample groups are in the DTMF-digit-detect state and correspond to the same DTMF digit; (2) no two sequential sample groups are in a state other than the DTMF-digit-detect state; and (3) no two sequential sample groups in the DTMF-digit-detect state correspond to one or more DTMF digits other than the DTMF digit corresponding to at least half of the first predetermined number of sample groups.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are incorporated in and constitute a part of this specification, illustrate one embodiment of the invention and, together with the description, serve to explain the objects, advantages, and principles of the invention. In the drawings.

DETAILED DESCRIPTION OF THE PREFERRED EMBODIMENT

Reference will now be made in detail to the present preferred embodiment of the invention, an example of which is illustrated in the accompanying drawings.

Figure 1:
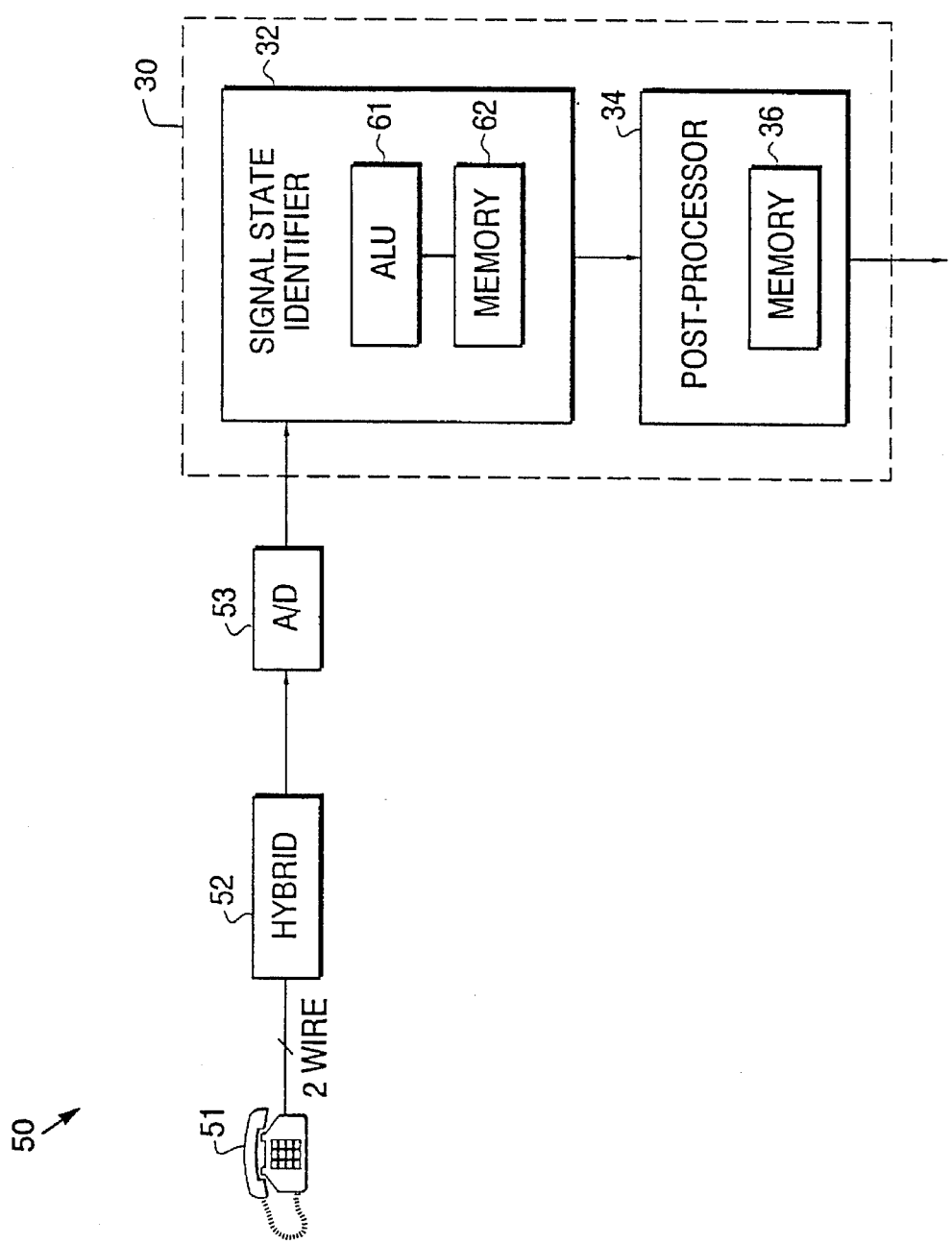
FIG. 1 is a block diagram showing the DTMF detector constructed in accordance with the preferred embodiment of the present invention when used in its preferred environment.

FIG. 1 shows a telephone network 50 system employing the DTMF digit detecting apparatus of the present invention.

Telephone network 50 includes at least one signalling source 51, such as a telephone, a hybrid circuit 52 connected to the signalling source via a two-wire pair, an analog-to-digital (A/D) converter 53 operating at the standard 8 kHz sampling frequency, and the DTMF digit detecting apparatus of the present ivnention, which is designated generally by the reference numeral 30. As will be explained in detail below, the DTMF digit detecting apparatus detects the presence of DTMF digits on the line connected to signalling source 51.

DTMF digit detecting apparatus 30 includes a signal state identifier 32 and a post-processor 34. Signal state identifier 32 includes an arithmetic logic unit (ALU) 61 and a memory 62 for storing data and an operating program.

In operation, signal state identifier 32 receives signals from a source 51, such as a conventional touch-tone telephone. Upon receiving a signal from a source, signal state identifier 32 analyzes the signal in much the same way as a conventional DTMF detector. Signal state identification means 32 differs from a conventional DTMF detector in that signal state identifier 32 provides three possible states rather than the two states (i.e., detect or no-detect), which a conventional DTMF detector typically indicates. Specifically, the signal state identifier 32 indicates whether the received digital signal is in a detect state, a no-detect low-energy state, or a no-detect high-energy state.

As embodied herein, signal state identifier 32 may consist of any conventional DTMF detector capable of being modified to provide a distinction between high-energy and low-energy no-detect states. Because most conventional DTMF detectors already analyze a received signal for its energy strength, signal state identifier 32 may consist of a conventional DTMF detector in which the software programmed into the DTMF processor is modified to provide an additional output state. Preferably, such a conventional DTMF has the capacity of handling 80 samples per 10 msec.

Figure 2:
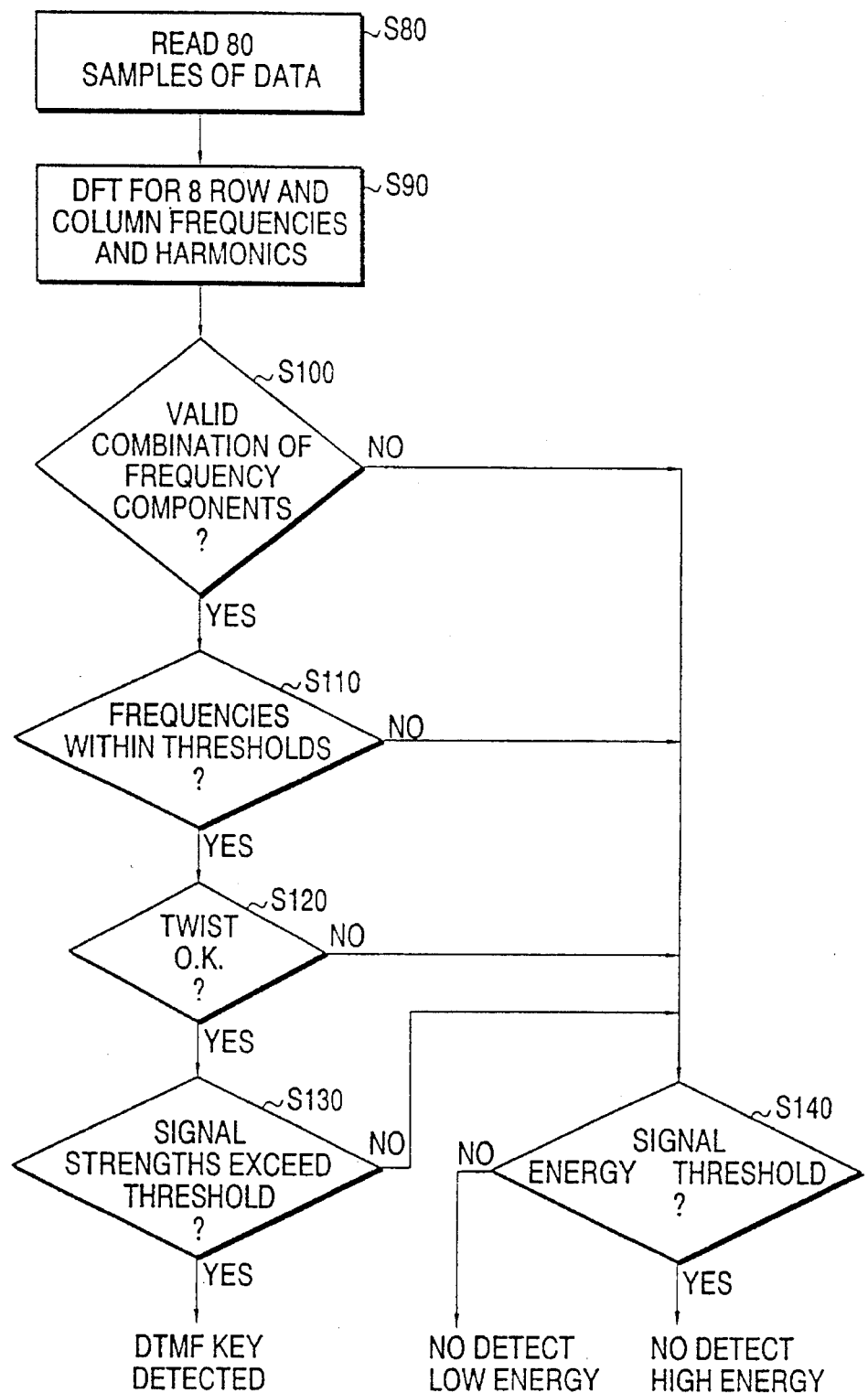
FIG. 2 is a flow chart showing the sequential tests the DTMF detector of the present invention performs on a received signal.

The flow chart in FIG. 2 illustrates the manner in which signal state identifier 32 operates.

In step S80, signal state identifier 32 reads 80 samples of data, which corresponds to 10 msec of data when the received signal is sampled at 8 kHz. Thus, signal state identifier 32 groups the received samples in groups of 80 covering 10 msec time intervals.

In step S90, signal state identifier 32 performs a discrete Fourier transform (DFT) operation for eight row and column frequencies and harmonics.

Following step S90, signal state identifier 32 performs the following four tests to determine whether a DTMF digit may be present. Because a valid DTMF digit is represented by a signal having two different frequency components in predefined combinations, the first test (Step 100) performed by signal state identifier 32 ensures that the received signal includes a valid combination of frequency components.

The second test (Step 110) performed by signal state identifier 32 determines whether the frequencies of the two components fall within predetermined thresholds.

The third test (Step 120) performed by signal state identifier 32 determines whether the received signal has an acceptable "twist." "Twist" is the difference in signal strength of the two frequency components. Thus, if one of the frequency components has a signal strength that exceeds that of the other component by an amount exceeding a predefined threshold, signal state identifier 32 identifies a no-detect state.

A fourth and final test (Step 130), which signal state identifier 32 performs, determines whether the signal strength of the two components exceeds a predetermined threshold. This predefined threshold energy level is preferably −25 dBm.

Provided the received signal passes all of the four tests, signal state identifier 32 issues an output signal indicative of a DTMF-digit-detect state. Signal state identifier 32 additionally indicates the identity of the DTMF digit detected based on the combination of frequency components that it detects.

On the other hand, if any one of these tests fails, signal state identifier 32 identifies a no-detect state.

Step S140 determines whether the signal having a no-detect state has an energy level that exceeds a predefined threshold. Preferably, this predefined threshold is −48 dBm. When the energy level exceeds the threshold, signal state identifier 32 outputs a signal indicating a no-detect high-energy state. On the other hand, when the energy level does not exceed the threshold, signal state identifier 32 outputs a signal indicating a no-detect low-energy state.

Upon receiving the output of signal state identifier 32, post-processor 34 performs post-processing procedures, which will be described in more detail below, by executing an algorithm stored in a memory 36 in order to more accurately detect DTMF digits. To provide more accurate detection, post-processor 34 analyzes the temporal history of the received signal. In so doing, post-processor 34 decreases false detection of a digit due to speech or other background sounds, and decreases the possibility of falsely identifying a single digit as two digits when the received signal has some small glitch or signal interruption.

To distinguish a valid DTMF digit from speech signals having a resemblance to a DTMF digit, the present invention looks for the sustained presence of no-detect low-energy states before and after a sustained DTMF digit detect state. By looking for the presence of these no-detect low-energy states, the present invention may distinguish between a signal representing a single digit having a small glitch and a signal representing two consecutive DTMF digits.

To distinguish between a valid DTMF digit signal having a small glitch and an invalid signal, the present invention looks for the continuous presence of abnormalities after the glitch is detected.

Ideally, the temporal history of a received DTMF signal includes a first predetermined time period in which the signal is in the no-detect low-energy state, a second predetermined time period in which the signal is in the DTMF digit detect state, and a third predetermined time period in which the signal returns to the no-detect low-energy state. Preferably, the first predetermined time period is at least 50 msec, the second predetermined time period is at least 50 msec, and the third predetermined time period is at least 20 msec. However, less than ideal DTMF signals may still constitute a valid DTMF digit. For example, the DTMF signal may have a small glitch and yet still be a valid DTMF digit. Accordingly, an object of the present invention is to distinguish when the less than ideal DTMF signal is a valid DTMF digit.

The detailed operation of the post-processor will now be described with reference to the state diagram shown in FIG. 3.

This state diagram illustrates the continuous flow of the process executed by post-processor 34. The state diagram shows numerous circles representing the various states in which the process may be in at any one point in time. The arrows between the circles represent conditions for entering the state represented by the circles and paths through which the process may flow. In particular, each arrow represents the procedural flow occurring after each sequential sample group of the signal received from signal state identifier 32 is analyzed. Preferably, each sample group corresponds to the state indicated by signal state identifier 32 over a 10 msec time period.

Various symbols appear on the state diagram, which consist of a letter or series of letters. Each of the symbols is associated with one of the flow arrows and represent one or more conditions that must exist for the process to flow from one state to the next in the direction of the corresponding arrow.

As discussed above, the output of signal state identifier 32 indicates one of the three possible states: (1) a DTMF-digit-detect state; (2) a no-detect low-energy state; and (3) a no-detect high-energy state. When signal state identifier 32 indicates a DTMF-digit-detect state it additionally identifies the DTMF digit that was detected.

Definitions of symbols, which account for the possible outputs from signal state identification means 32, are provided as follows:

| | |
|---|---|
| a | Any DTMF digit detected with no restriction on history. |
| n | No DTMF digit detected (energy may be high or low). |
| $n_l$ | No DTMF digit detected, energy low. |
| $n_h$ | No DTMF digit detected, energy high. |
| $d_x$ | Current identified DTMF digit. |
| $d_y$ | Previously identified DTMF digit immediately preceding currently identified DTMF digit $d_x$. |
| $d_z$ | Previously identified DTMF digit preceding previously identified DTMF digit $d_y$. |

Definitions of symbols, which account for the possible combinations of outputs from signal state identifier 32 when one or DTMF digits are detected, are provided as follows:

| | |
|---|---|
| d | Current detected DTMF digit has the same identity as the previously detected DTMF digit ($d_x = d_y$). |
| o | Current detected DTMF digit has a different identity than the previously detected DTMF digit ($d_x \neq d_y$). |
| e | Current detected DTMF digit has a different identity than either of the two previously detected DTMF digits ($d_x \neq d_y$ and $d_x \neq d_z$). |
| c | Current detected DTMF digit has the same identity as the immediately preceding detected DTMF digit, but a different identity than the detected DTMF digit preceding the immediately preceding digit ($d_x = d_y$ and $d_x \neq d_z$). |
| b | Current detected DTMF digit has a different identity than the immediately preceding detected DTMF digit, but the same identity as the detected DTMF digit preceding the immediately preceding digit ($d_x \neq d_y$ and $d_x = d_z$). |

Definitions of symbols, which account for other possible combinations of outputs from signal state identifier 32, are provided as follows:

| | |
|---|---|
| f | Current state of e OR current detect of $n_h$. |
| g | Current state of b following a detect of a OR current state of d following a detect of n. |
| p | Current state of o OR current detect of n. |
| q | Current state of b or c. |
| r | Current state of o OR current detect of n following a previous detect of a. |
| s | Current detect of $n_l$ following a previous detect of $n_l$. |
| t | Current detect of $n_l$ following a previous state of o OR current detect of $n_l$ following a previous detect of $n_h$. |
| u | Current state of d following a previous detect of a OR current detect of a following a previous detect of $n_h$. |
| v | Current detect of $n_l$ following a previous detect of $n_h$. |
| w | Current detect of $n_h$ following a previous detect of $n_h$. |
| x | Current state of e OR current detect of $n_h$ OR current state of d following a previous state of o OR current state of o following a detect of n. |

Figure 3:
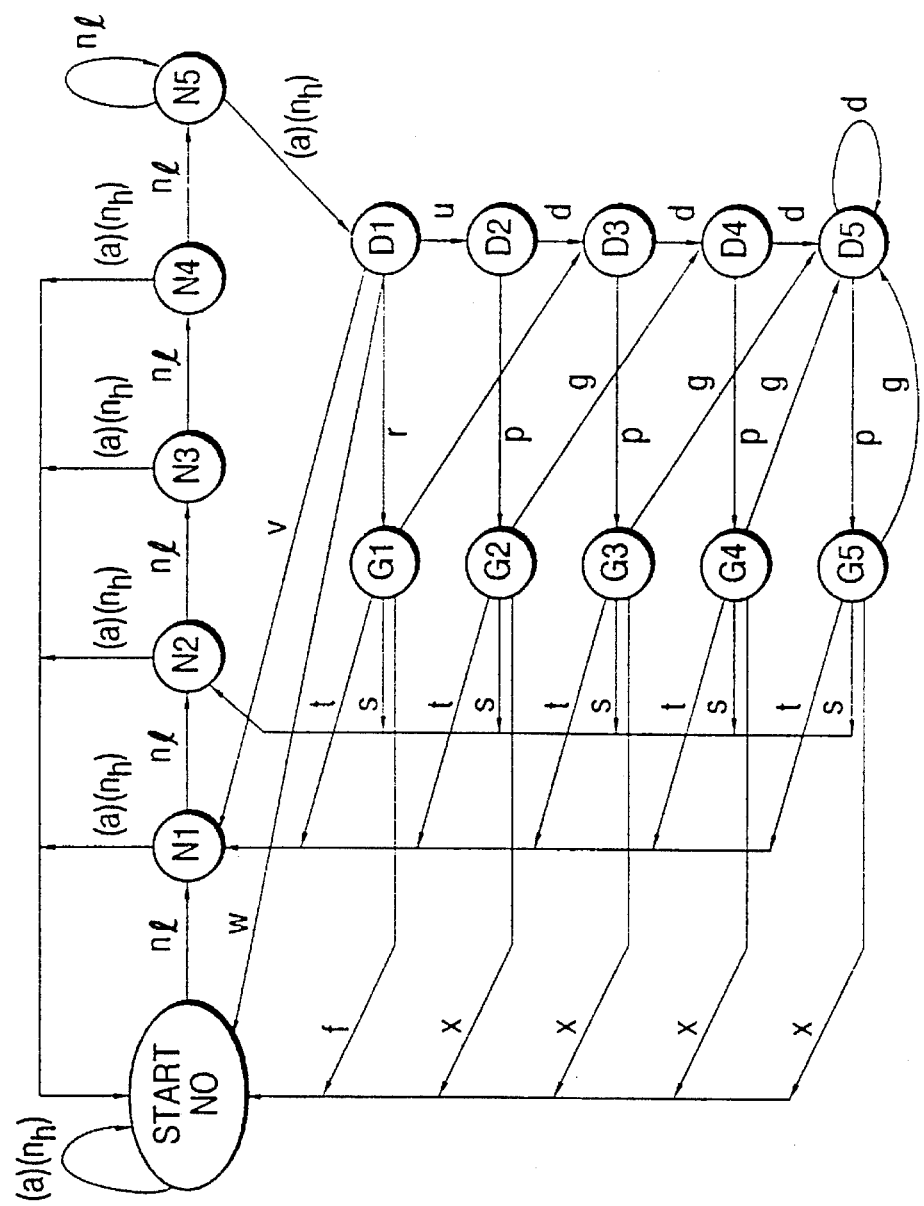
FIG. 3 is a state diagram illustrating the detailed operation of the preferred embodiment.

Referring to the state diagram in FIG. 3, the processing starts at the circle labelled START (N0). In state N0, the post-processor 34 continues to reinitialize itself until a no-detect low-energy state is detected. When the post-processor 34 detects the first no-detect low-energy state, the process moves to state N1. In state N1, if the post-processor 34 detects a no-detect low-energy state for the next sample group, the process moves to state N2. On the other hand, if the post-processor 34 detects a state other than a no-detect low-energy state for the next sample group, the process moves back to state N0 and the process is reinitialized.

In states N1 through N4, if a state is detected for a current sample group that is a state other than a no-detect low-energy state, the process is reinitialized at step N0. On the other hand, when a no-detect low-energy state is detected in states N1 through N4, the process flows to the next state until state N5 is reached.

In state N5, if no-detect low-energy states are detected for subsequent sample groups, the process continues to remain in state N5. Thus, the process may permit periods of more than 50 msec to exist before a digit is detected. Moreover, the flow of the process through states N1 through N5 serves to ensure that the DTMF digit signal remains in the no-detect low-energy state for at least 50 msec before another state is detected. Thus, unless state N5 is reached before post-processor 34 detects a state other than the no-detect low energy state, post-processor 34 will not identify the received signal as a DTMF digit candidate.

Once the post-processor 34 identifies a DTMF digit candidate, it moves to state D1 upon the detection of a state other than a no-detect low-energy state. Provided the post-processor 34 subsequently detects DTMF-digit-detect states representing the same detected digit for four more consecutive sample groups the post-processor 34 enters state D5 via states D2, D3, and D4. Should post-processor 34 detect some other state after entering state D1, one of states G1, G2, G3, and G4 is entered to determine whether the existence of this other state represents a mere glitch or an invalid signal.

In states G1, G2, G3, G4, or G5, if a second state other than a DTMF-digit-detect state is detected, the post-processor 34 reinitializes the process by returning to one of states N0, N1, and N2 depending upon the number of no-detect low-energy states that post-processor 34 has consecutively detected. In this manner, states G1, G2, G3, and G4 prevent the detection of a valid DTMF digit when two consecutive sample groups are inconsistent with the detected DTMF digit.

Once the process reaches state D5, it remains there so long as post-processor 34 continues to detect a DTMF-digit-detect state representing the same detected digit. In state D5, once the post-processor 34 detects a different state, the process moves to state G5.

In state G5, post-processor 34 identifies a valid DTMF digit upon the detection of a no-detect low-energy state following the detection of one of (1) a no-detect low-energy state, (2) a no-detect high-energy state, or (3) a DTMF digit having a different identity than the previously detected DTMF digit.

As embodied herein, the "sample grouping means for grouping samples of the received signal into sample groups" corresponds to signal state identifier 32 performing step S80 shown in FIG. 4. This term should not be construed as limited to the disclosed structure, but should encompass any structure capable of performing the function recited in the claims.

As embodied herein, the "digit candidate identification means for identifying a digit candidate when the presence of a state other than the no-detect low-energy state is detected following a detection of the presence of the no-detect low-energy state for a predetermined period of time" corresponds to post-processor 34 performing the analysis steps on the received signal to reach state N5. This term should not be construed as limited to the disclosed structure, but should encompass any structure capable of performing the function recited in the claims.

As embodied herein, the "valid digit identifying means for identifying a digit candidate as a valid DTMF digit" corresponds to post-processor 34 performing the analysis steps on a DTMF digit candidate (state N5) to subsequently reach state D5. When the "valid digit identifying means" identifies a digit candidate as a valid DTMF digit only when "the presence of a no-detect state is detected for a third predetermined time period following detection of the presence of the DTMF-digit-detect state or the allowable combinations of DTMF-digit-detect states and other states," the "valid digit identifying means" additionally corresponds to post-processor 34 performing the analysis steps on the DTMF digit candidate to subsequently exit state G5 meeting conditions s or t defined above. This term should not be construed as limited to the disclosed structure, but should encompass any structure capable of performing the function recited in the claims.

Rather than further explain each and every other possible permutation of the process in the state diagram, examples are provided below to illustrate the proper interpretation of the state diagram, and thereby enable the reader to interpret the state diagram for any other possible permutations.

EXAMPLE 1

Figure 4A:
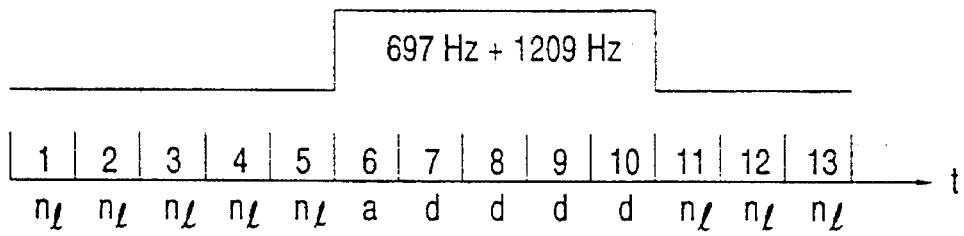
FIGS. 4(a) through 4(d) are graphic illustrations of exemplary signals that the present invention may receive and analyze.

FIG. 4(a) shows an example of the ideal DTMF digit signal. The ideal DTMF digit signal remains in the no-detect low-energy state for at least 50 msec (five 10 msec samples) preceding a DTMF-digit-detect state. Further, the ideal DTMF digit signal will remain in the DTMF-digit-detect state for at least 50 msec. In addition, when the ideal DTMF digit signal is in the DTMF-digit-detect state, no glitches, which may be in the form of a change in the identity of the digit detected or in a change to a no-detect state, are present. Lastly, the ideal DTMF digit signal remains in the no-detect low-energy state for at least 20 msec following a DTMF-digit-detect state.

Because the ideal DTMF digit signal of this example remains in the no-detect low-energy state for five sequential sample groups, the process flow moves from state N0 to state N5.

The above sequence is summarized in Table 1 below.

TABLE 1

| Sample Group Number | Current State | DTMF Detector Result | Next State | Output |
|---|---|---|---|---|
| 1 | N0 | $n_l$ | N1 | — |
| 2 | N1 | $n_l$ | N2 | — |
| 3 | N2 | $n_l$ | N3 | — |
| 4 | N3 | $n_l$ | N4 | — |
| 5 | N4 | $n_l$ | N5 | — |
| 6 | N5 | a | D1 | — |
| 7 | D1 | d | D2 | — |
| 8 | D2 | d | D3 | — |
| 9 | D3 | d | D4 | — |
| 10 | D4 | d | D5 | — |
| 11 | D5 | $n_l$ | G5 | — |
| 12 | G5 | $n_l$ | N1 | Key '0' |
| 13 | N1 | $n_l$ | N2 | — |

EXAMPLE 2

Figure 4B:
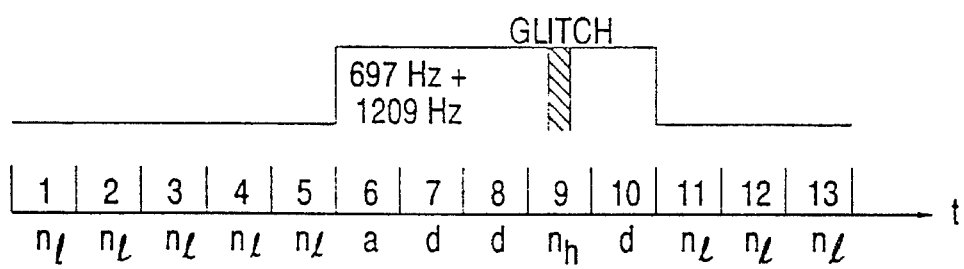

FIG. 4(b) shows a DTMF digit signal having a glitch. A glitch occurs due to signal abnormalities that present themselves when post-processor 34 detects a no-detect low-energy state, a no-detect high-energy state, or the detection of a DTMF digit having an identity different than the previously identified DTMF digit, during a period when DTMF-digit-detect states having the same digit identity should normally be detected. In this case, the process proceeds in the same manner as in the first example, until the time that the post-processor 34 first detects the glitch. In this example, the glitch occurs in the ninth sample group. Thus, the process continues as in the first example up to state D3. Following state D3, post-processor 34 detects a no-detect high-energy state causing the process to divert to state G3.

Following entry of state G3, post-processor 34 detects a DTMF-digit-detect state having the same identity as the previously detected DTMF digit. Thus, the process moves to state D5 and continues in the same manner as the first example.

The above sequence is summarized in Table 2 below.

TABLE 2

| Sample Group Number | Current State | DTMF Detector Result | Next State | Output |
|---|---|---|---|---|
| 1 | N0 | $n_l$ | N1 | — |
| 2 | N1 | $n_l$ | N2 | — |
| 3 | N2 | $n_l$ | N3 | — |
| 4 | N3 | $n_l$ | N4 | — |
| 5 | N4 | $n_l$ | N5 | — |
| 6 | N5 | a | D1 | — |
| 7 | D1 | d | D2 | — |
| 8 | D2 | d | D3 | — |
| 9 | D3 | $n_h$ | G3 | — |
| 10 | G3 | d | D5 | — |
| 11 | D5 | $n_l$ | G5 | — |
| 12 | G5 | $n_l$ | N21 | Key '0' |
| 13 | N1 | $n_l$ | N2 | — |

Because conventional DTMF detectors are incapable of distinguishing between a mere glitch and an invalid signal, conventional DTMF detectors confronted with a DTMF digit signal as shown in FIG. 4(b), would typically improperly identify such a signal as an invalid signal or identify the signal as two separate DTMF digits.

EXAMPLE 3

Figure 4C:
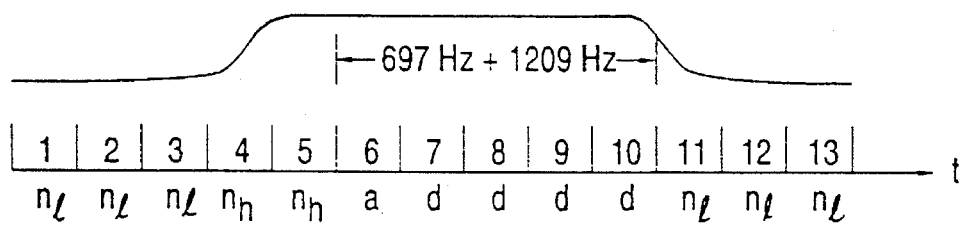

FIG. 4(c) shows an example of a segment of speech in which the DTMF signals for key '0' (697 Hz and 1209 Hz) are present for 50 msec. A conventional DTMF detector may declare the segment as a valid digit. The post-processor 34, however, rejects this segment as an invalid digit as shown by the state diagram and Table 3 below.

TABLE 3

| Sample Group Number | Current State | DTMF Detector Result | Next State | Output |
|---|---|---|---|---|
| 1 | N0 | $n_l$ | N1 | — |
| 2 | N1 | $n_l$ | N2 | — |
| 3 | N2 | $n_l$ | N3 | — |
| 4 | N3 | $n_h$ | N0 | — |
| 5 | N0 | $n_h$ | N0 | — |
| 6 | N0 | a | N0 | — |
| 7 | N0 | d | N0 | — |
| 8 | N0 | d | N0 | — |
| 9 | N0 | d | N0 | — |
| 10 | N0 | d | N0 | — |
| 11 | N0 | $n_l$ | N1 | — |
| 12 | N1 | $n_l$ | N2 | — |
| 13 | N2 | $n_l$ | N3 | — |

Thus, post-processor 34 rejects the segment as an invalid digit because the segment never qualifies as a DTMF digit candidate insofar as five samples in the no-detect low-energy state are never detected initially.

EXAMPLE 4

Figure 4D:
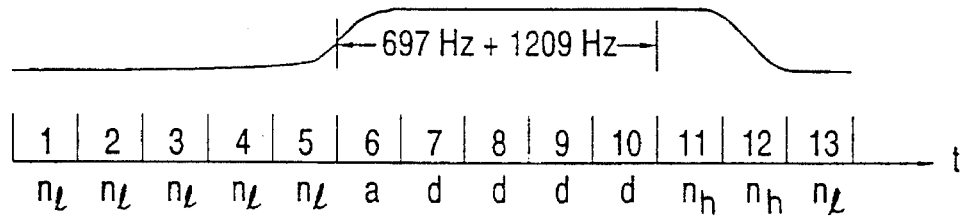

FIG. 4(d) shows another example of a segment of speech in which the DTMF signals for key '0' (697 Hz and 1209 Hz) are present for 50 msec. A conventional DTMF detector may declare the segment as a valid digit. The post-processor 34, however, rejects this segment as an invalid digit as shown by the state diagram and Table 4 below.

TABLE 4

| Sample Group Number | Current State | DTMF Detector Result | Next State | Output |
|---|---|---|---|---|
| 1 | N0 | $n_l$ | N1 | — |
| 2 | N1 | $n_l$ | N2 | — |
| 3 | N2 | $n_l$ | N3 | — |
| 4 | N3 | $n_l$ | N4 | — |
| 5 | N4 | $n_l$ | N5 | — |
| 6 | N5 | a | D1 | — |
| 7 | D1 | d | D2 | — |
| 8 | D2 | d | D3 | — |
| 9 | D3 | d | D4 | — |
| 10 | D4 | d | D5 | — |
| 11 | D5 | $n_h$ | G5 | — |
| 12 | G5 | $n_h$ | N1 | — |
| 13 | N1 | $n_l$ | N2 | — |

Thus, post-processor 34 rejects the segment as an invalid digit because the otherwise valid DTMF-digit-detect states are not followed by at least two sample groups in different states where the second sample group is in the no-detect low-energy state.

Although the present invention has been described with reference to 10 msec samples defining a 50 msec period of no-detect low-energy, followed by a 50 msec period of DTMF-digit-detect states, followed, in turn, by a 20 msec period of no-detect states, the present invention is not limited thereto. The present invention may be readily modified to utilize any particular sample periods or time periods. The indicated times merely reflect the inventors' present perception of the best mode for carrying out the present invention.

The foregoing description of preferred embodiment of the invention has been presented for purposes of illustration and description. It is not intended to be exhaustive or to limit the invention to the precise form disclosed, and modifications and variations are possible in light of the above teachings or may be acquired from practice of the invention. The embodiment was chosen and described in order to explain the principles of the invention and its practical application to enable one skilled in the art to utilize the invention in various embodiments and with various modifications as are suited to the particular use contemplated. It is intended that the scope of the invention be defined by the claims appended hereto, and their equivalents.

What is claimed is:

1. A method of determining whether a received signal contains a candidate valid dual tone multifrequency (DTMF) digit comprising the steps of:

taking samples of the received signal;

testing said samples to determine whether any of said samples qualify as a potential DTMF digit;

identifying said samples as having a DTMF-digit-detect state if said testing reveals that said samples qualify as a potential DTMF digit;

if said testing reveals that any of said samples do not qualify as a potential DTMF digit, measuring the energy level of said samples that do not qualify;

determining that said samples that do not qualify are in a no-detect high-energy state if said measured energy level exceeds a predefined threshold, and determining that said samples that do not qualify are in a no-detect low-energy state if said measured energy level is below a predefined threshold; and using said DTMF-digit detect states, said no-detect high-energy states, and said no-detect low energy states of said samples to identify the presence of said candidate valid DTMF digit.

2. The method of claim 1, wherein said samples are sampled at 10 msec intervals.

3. The method of claim 1, wherein the presence of said candidate valid DTMF digit is identified when one of said samples is in a state other than the no-detect low-energy state following a detection that a predetermined number of said samples are in the no-detect low-energy state.

4. The method of claim 2, wherein said candidate valid DTMF digit is identified when one of said samples is in a state other than the no-detect low-energy state following a detection that five said samples are in the no-detect low-energy state.

5. The method of claim 1 further comprising the step of:

identifying said candidate valid DTMF digit as a valid DTMF digit when a predetermined combination of said states corresponding to a predetermined number of said samples is detected.

6. The method of claim 5, wherein said candidate valid DTMF digit is identified as said valid DTMF digit when (1) at least a first predetermined number of said samples are in the DTMF-digit-detect state or in a predetermined combination of said states, and (2) at least a second predetermined number of said samples taken after said first predetermined number of said samples are in the no-detect low-energy state.

7. The method of claim 6, wherein said first predetermined number of said samples and said second predetermined number of said samples are taken at 10 msec intervals, the first predetermined number of said samples comprises five, and the second predetermined number of said samples comprises two.

8. The method of claim 6, wherein at least half of the first predetermined number of said samples are in the DTMF-digit-detect state and no two consecutive samples are in a state other than the DTMF-digit-detect state.

9. The method of claim 6, further comprising the step of:

identifying a DTMF digit corresponding to said sample that is in a DTMF-digit-detect state, wherein a predetermined combination of said states exists provided the following conditions are met: (1) at least half of the first predetermined number of said samples are in the DTMF-digit-detect state and correspond to the same DTMF digit; (2) no two sequential said first predetermined number of said samples are in a state other than the DTMF-digit-detect state; and (3) no two sequential said first predetermined number of said samples in the DTMF-digit-detect state correspond to one or more DTMF digits other than the DTMF digit corresponding to at least half of the first predetermined number of said samples.

10. A method of determining whether a received signal contains a valid dual tone multifrequency (DTMF) digit comprising the steps of:

taking samples of the received signal;

testing said samples to determine whether any of said samples qualify as a potential DTMF digit;

identifying said samples as having a DTMF-digit-detect state if said testing reveals that said samples qualify as a potential DTMF digit;

if said testing reveals that any of said samples do not qualify as a potential DTMF digit, measuring an energy level of said samples that do not qualify;

determining that said samples that do not qualify are in a no-detect high-energy state if said energy level exceeds a predefined threshold, and determining that said samples that do not qualify are in a no-detect low-energy state if said energy level is below a predefined threshold;

identifying a DTMF digit corresponding to one of said samples in said DTMF-digit-detect state; and identifying a valid said DTMF digit when at least a first predetermined number of said samples are in the DTMF-digit detect state or in a predetermined combination of said states as follows: (1) at least half of the first predetermined number of said samples are in the DTMF-digit-detect state and correspond to the same DTMF digit; (2) no two sequential said samples are in a state other than the DTMF-digit-detect state; and (3) no two sequential said samples in the DTMF-digit-detect state correspond to one or more DTMF digits other than the DTMF digit corresponding to at least half of the first predetermined number of said samples.

11. An apparatus for determining whether a received signal contains a candidate valid dual tone multifrequency (DTMF) digit comprising:

means for taking samples of the received signal;

means for testing said samples to determine whether any of said samples qualify as a potential DTMF digit;

means for identifying said samples as having a DTMF-digit-detect state if said testing reveals that said samples qualify as a potential DTMF digit;

means for measuring an energy level of said samples that do not qualify as a potential DTMF digit;

means for determining that said samples that do not qualify are in a no-detect high-energy state if said energy level exceeds a predefined threshold, and determining that said samples that do not qualify are in a no-detect low-energy state if said energy level is below a predefined threshold; and means for using said DTMF-digit detect states, said no-detect high-energy states, and said no-detect low energy states of said samples to identify the presence of said candidate valid DTMF digit.

12. A signal state identifying device comprising:

means for taking samples of the received signal;

means for testing said samples to determine whether any of said samples qualify as a potential DTMF digit;

means for identifying that said samples are in a DTMF-digit-detect state if said testing reveals that said samples qualify as a potential DTMF digit;

means for measuring an energy level of said samples that do not qualify as a potential DTMF digit; and means for determining that said samples that do not qualify are in a no-detect high-energy state if said measured energy level exceeds a predefined threshold, and determining that said samples that do not qualify are in a no-detect low-energy state if said energy level is below a predefined threshold.

13. An apparatus for determining whether a received signal contains a valid dual tone multifrequency (DTMF) digit comprising:

means for taking samples of the received signal;

means for testing said samples to determine whether any of said samples qualify as a potential DTMF digit;

means for identifying said samples as being in a DTMF-digit-detect state if said testing reveals that said samples qualify as a potential DTMF digit;

means for measuring an energy level of said samples that do not qualify as a potential DTMF digit;

means for determining that said samples that do not qualify are in a no-detect high-energy state if said measured energy level exceeds a predefined threshold, and determining that said samples that do not qualify are in a no-detect low-energy state if said energy level is below a predefined threshold;

means for using said DTMF-digit detect states, said no-detect high-energy states, and said no-detect low energy states of said samples to identify the presence of a candidate valid DTMF digit; and means for identifying said candidate valid DTMF digit as a valid DTMF digit when a predetermined combination of said states corresponding to a predetermined number of said samples is detected.

14. An apparatus for determining whether a received signal contains a valid dual tone multifrequency (DTMF) digit comprising:

means for taking samples of the received signal;

means for testing said samples to determine whether any of said samples qualify as a potential DTMF digit;

means for identifying that said samples are in a DTMF-digit-detect state if said testing reveals that said samples qualify as a potential DTMF digit;

means for measuring an energy level of said samples that do not qualify as a potential DTMF digit;

means for determining that said samples that do not qualify are in a no-detect high-energy state if said measured energy level exceeds a predefined threshold, and determining that said samples that do not qualify are in a no-detect low-energy state if said energy level is below a predefined threshold;

means for identifying a DTMP digit corresponding to one of said samples in said DTMP-digit-detect state; and means for identifying said valid DTMP digit when at least a first predetermined number of said samples are in the DTMP-digit detect state or in predetermined combinations of said states as follows: (1) at least half of the first predetermined number of said samples are in the DTMP-digit-detect state and correspond to the same DTMP digit; (2) no two sequential said samples are in a state other than the DTMP-digit-detect state; and (3) no two sequential said samples in the DTMP-digit- detect state correspond to one or more DTMP digits other than the DTMF digit corresponding to at least half of the first predetermined number of said samples.

* * * * *